United States Patent [19]

Kölliker

[11] 4,006,163
[45] Feb. 1, 1977

[54] ANTHRAQUINONE DYESTUFFS

[75] Inventor: Hans Peter Kölliker, Munchenstein, Switzerland

[73] Assignee: Ciba-Geigy Corporation, Ardsley, N.Y.

[22] Filed: Feb. 20, 1973

[21] Appl. No.: 333,823

[30] Foreign Application Priority Data

Mar. 21, 1972 Switzerland .............. 4169/72

[52] U.S. Cl. .................. 260/326 C; 260/240 D; 260/325 PH; 8/39 C; 8/40

[51] Int. Cl.² .................. C09B 5/24; C07D 209/66; C07D 209/68

[58] Field of Search ............ 260/326 C, 325, 240 D

[56] References Cited

UNITED STATES PATENTS

| | | | |
|---|---|---|---|
| 2,338,908 | 1/1944 | Dickey et al. | 260/376 |
| 3,631,184 | 12/1971 | Guye-Vuilleme | 260/380 |
| 3,636,065 | 1/1972 | Guye-Vuilleme et al. | 260/376 |
| 3,687,985 | 8/1972 | Maier | 260/376 |
| 3,689,510 | 9/1972 | Kölliker et al. | 260/376 |
| 3,752,831 | 8/1973 | Diamantaglou et al. | 260/376 |
| 3,803,168 | 4/1974 | Kölliker et al. | 260/326 C |

Primary Examiner—Donald G. Daus
Attorney, Agent, or Firm—Joseph G. Kolodny; Edward McC. Roberts; Prabodh I. Almaula

[57] ABSTRACT

An anthraquinone dye of sparing aqueous solubility of the formula

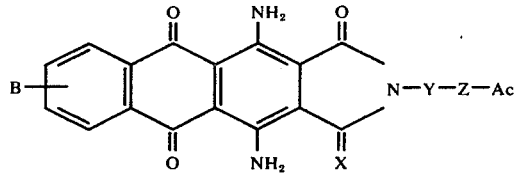

wherein X represents oxygen or NH, Y represents alkylene having 1 to 4 carbon atoms which is optionally interrupted by oxygen, nitrogen or sulphur, Z represents oxygen or $-NR_1$, in which $R_1$ represents an alkyl having 1 to 4 carbon atoms or hydrogen, Ac represents the acyl radical of a carboxylic acid having up to 8 carbon atoms, a sulphuric acid having up to 7 carbon atoms or a carbamic acid having up to 8 carbon atoms, and B represents chlorine, bromine or hydrogen. The new dyestuffs dye polyester fibres in very fast blue shades.

14 Claims, No Drawings

ANTHRAQUINONE DYESTUFFS

The present invention relates to new anthraquinone dyes of sparing aqueous solubility which are useful as disperse dyes, a process for their manufacture, the use of the new anthraquinone dyes for dyeing hydrophobic organic material, in particular textile fibres of linear polyester produced by the condensation of aromatic polycarboxylic acids with polyhydrix alcohols, or of cellulose esters, and to the fibre material in the form of an industrial product dyed with the new dyes.

The invention provides valuable new anthraquinone dyes of slight aqueous solubility, of the formula

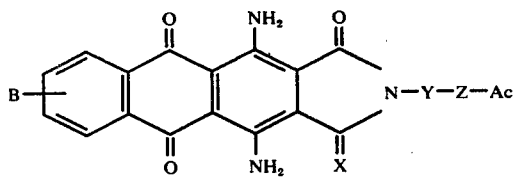

wherein X represents an oxygen atom or a NH group, Y represents an optionally substituted alkylene radical, Z represents an oxygen atom or a —$NR_1$ group, in which $R_1$ represents an alkyl radical or, preferably, a hydrogen atom, Ac represents the acyl radical of an organic carboxylic acid, sulphonic acid or carbamic acid, and B represents a halogen atom or, preferably, a hydrogen atom.

The new dyes are obtained either (a) by condensing a compound of the formula

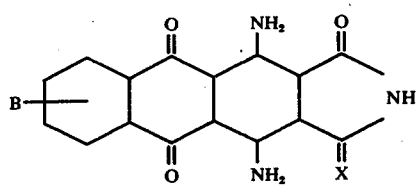

with a compound of the formula X'-Y-Z-Ac, wherein X' represents a halogen atom, preferably a bromine or chlorine atom or a primary amino group, it being also possible, if X' = $NH_2$, to make a start from an anthraquinone compound of the formula (IIa)

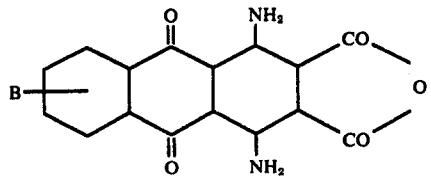

or (b) by acylating a compound of the formula (III)

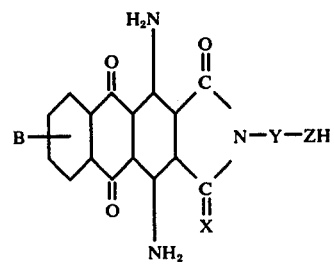

with an anhydride or halide of the acid HO-Ac.

The starting materials herein are so chosen that the resulting anthraquinone dye is free from water-solubilising groups which exhibit acid dissociation in water, i.e. that it contains, for example, no sulphonic, carboxylic or phosphoric acid groups. The alkylene group Y contains preferably a maximum of 10 carbon atoms; it can be branched or straight-chain and interrupted by heteroatoms, such as sulphur, nitrogen and oxygen atoms.

Suitable examples of alkylene groups Y are the groups of the formulae:

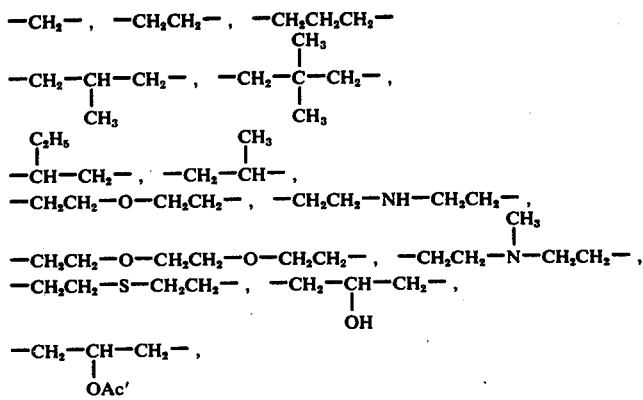

wherein Ac' represents the same radicals as Ac.

Suitable for acylating the dye of the formula (III) at the free hydroxy group are, for example, the anhydrides of lower carboxylic acids, such as acetic anhydride or propionic anhydride, as well as the halides of aliphatic, aromatic and heterocyclic carboxylic acids, and aliphatic, cycloaliphatic, aromatic or heterocyclic isocyanates, or the corresponding carbamic halides. As examples of acyl radicals there may be cited:

the radicals of aliphatic carboxylic acids with 1 to 18 carbon atoms, such as the formyl, acetyl, propionyl, butyryl, 1-methyl-butyryl, 2-methyl-butyryl, 1-ethyl-butyryl, dimethylpropionyl, pentanoyl, hexanoyl, 1-ethyl-hexanoyl, heptanoyl, octanoyl, nonanoyl, decanoyl, dodecanoyl, tetradecanoyl, hexadecanoyl, octadecanoyl, acrylyl, methacrylyl, α-bromoacrylyl, crotylyl, 2-methylmercaptopropionyl, 4-chlorobutyryl, chloroacetyl and ethoxyacetyl radical; the radicals of cycloaliphatic carboxylic acids, such as the cyclohexanecarbonyl, methylcyclohexanecarbonyl and dimethylcyclohexanecarbonyl radical; the radicals of araliphatic carboxylic acids, such as the phenylacetyl, β-phenylpropionyl, methylphenylacetyl, phenoxyacetyl, p-chlorophenoxyacetyl, styrylcarbonyl and cinnamylcarbonyl radical; the radicals of aromatic carboxylic acids, such as the benzoyl, methylbenzoyl, chlorobenzoyl, methoxybenzoyl, 4-phenyl-benzoyl, dichlorobenzoyl, nitrobenzoyl, methylmethoxybenzoyl, benzoylbenzoyl, chloronitrobenzoyl, dimethylbenzoyl, ethoxybenzoyl, α-naphthoyl and the β-naphthoyl radical; the radicals of aliphatic sulphonic acids with 1 to 18 carbon atoms, such as the methanesulphonyl, ethanesulphonyl, propanesulphonyl, butanesulphonyl, iso-butanesulphonyl, pentasulphonyl, iso-pentanesulphonyl hexasulphonyl, heptasulphonyl, octasulphonyl, decasulphonyl, dodecanesulphonyl, hexadecanesulphonyl, β-methoxyethanesulphonyl and β-ethoxyethanesulphonyl radical; the radicals of cycloaliphatic sulphonic acids, such as the cyclohexanesulphonyl and methylcyclohexanesulphonyl radical; the radicals of araliphatic sulphonic acids, such as the benzylsulphonyl radical; the radicals of carbamic acids, such as the methylaminocarbonyl, ethylaminocarbonyl, propylaminocarbonyl, butylaminocarbonyl, hexylaminocarbonyl, 2-chloroethylaminocarbonyl, dodecylaminocarbonyl, octylaminocarbonyl, p-phenylazophenylaminocarbonyl, cyclohexylaminocarbonyl, methyloxycarbonylmethylaminocarbonyl, butyloxycarbonylmethylaminocarbonyl, phenylaminocarbonyl, tolylaminocarbonyl, chlorophenylaminocarbonyl, dimethylphenylaminocarbonyl, nitrophenylaminocarbonyl, dichlorophenylaminocarbonyl, methoxyphenylaminocarbonyl, naphthylaminocarbonyl, biphenylylaminocarbonyl, tetrahydrofuryl-2-aminocarbonyl, pyridyl-3-aminocarbonyl, furyl-2-aminocarbonyl, and sulphonanyl-3-aminocarbonyl radicals; and the radicals of sulphonic acids, such as benzenesulphonyl, toluenesulphonyl, ethylbenzenesulphonyl, dimethylbenzenesulphonyl, and ethoxybenzenesulphonyl radicals (the respective o-, m- and p-isomers also being possible).

The reaction of the anthraquinone compounds of the formula III with the acid halides is appropriately carried out at low temperatures (0°–50° C) in the presence of acid binding agents and, optionally, in inert organic solvents.

Suitable acid binding agents are in particular nitrogen bases, such as pyridine, picoline, quinoline, lepidine, aliphatic amines, such as trimethylamine and triethylamine, anilines, such as N,N-dimethylaniline, and N,N-diethylaniline, also alkali or alkaline earth metal carbonates, hydrogen carbonates or hydroxides, such as sodium hydrogen carbonate, potassium carbonate, barium carbonate, sodium hydroxide or barium hydroxide. Suitable inert organic solvents are optionally halogenated or nitrated aromatic hydrocarbons, such as toluene, xylenes, chlorobenzene, dichlorobenzene or nitrobenzene, also aliphatic halogenated hydrocarbons such as chloroform, carbon tetrachloride or tetrachloroethane, also aliphatic ketones, such as acetone, and cyclic ethers, such as dioxan or tetrahydrofuran.

If isocyanates are used as acylating agents, the inert solvents cited hereinabove are also possible as well as the above mentioned tertiary nitrogen bases, and the reaction is performed by heating preferably to 50°–150° C.

The above described reaction of the compounds of the formula (II) with a ω-haloalkyl ester or amide of the formula

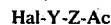

wherein Hal represents a halogen atom, preferably a bromine or chlorine atom, and Y, Z and Ac have the same meanings as in the formula (I), is carried out in analogous manner to the above described acylation with acid halides in inert solvents and in the presence of acid binding agents, preferably at 50° to 200° C.

The reaction of the compounds of the formula $H_2N$-Y-Z-Ac with the anhydride of the formula IIa is carried out at 50°–130° C, optionally in inert solvents, such as methanol, propanol, benzene, o-dichlorobenzene or nitrobenzene.

A further possibility of manufacturing the dyes according to the invention consists in the following reaction sequence:

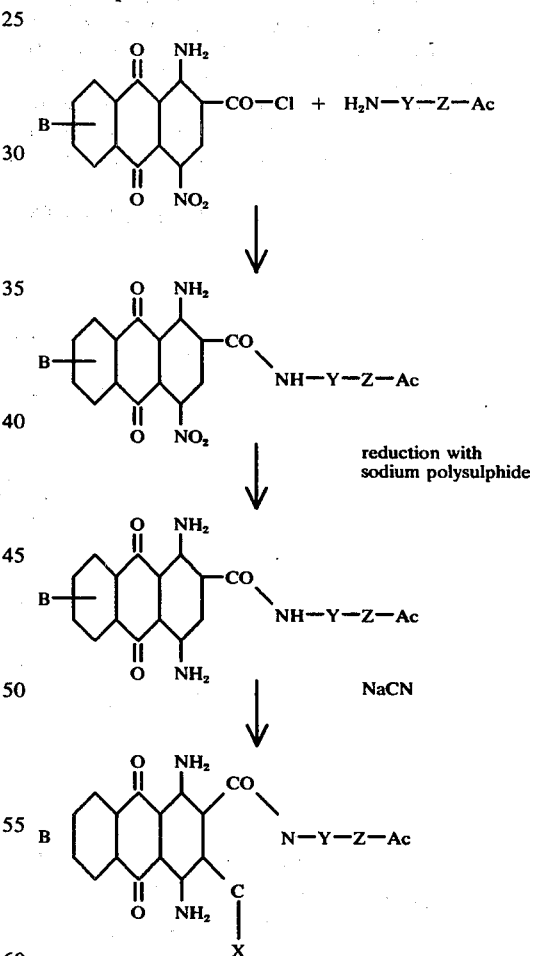

[the imine (X=NH) can be hydrolised to the anhydride in known manner]. The manufacturing process described hereinbefore is particularly suitable for carbamates.

Particularly valuable dyes are also those mixtures of dyes of the formula (I) in which the radical X partly represents an oxygen atom and partly an imino group. Such mixtures are obtained by starting from starting compounds in which the imino group is partially hydrolysed to the oxo group.

The new anthraquinone dyes of the formula I are intensely coloured, crystalline substances which are sparingly soluble in water. They can be obtained pure (melting point determination) by recrystallisation from organic solvents, but such a purification is as a general rule unnecessary for their use in dyeing.

They are suitable for dyeing or printing synthetic organic fibre material, for example for dyeing fibre which consists of linear, high molecular esters of aromatic polycarboxylic acids with polyhydric alcohols, such as polyethylene glycol terephthalate or poly-(1,4-cyclohexanedimethylol-terephthalate), also for dyeing fibre material made from cellulose-2½-acetate or cellulose triacetate. These dyes can also be used for dyeing synthetic polyamide fibres, such as polyhexamethylene dipinamide, polycaprolactam or polyaminoundecane acid, also for dyeing polyolefines, in particular polypropylene fibres.

Furthermore, depending on their composition, they are suitable for colouring or pigmenting lacquers, oils and waxes, as well as cellulose derivatives, in particular cellulose esters, such as cellulose acetate, or the dope dyeing of polyamides.

The cited fibre materials are preferably dyed from aqueous dispersion with the anthraquinone dyes of sparing aqueous solubility according to the invention.

It is appropriate, therefore, to finely divide the representatives suitable for use as disperse dyestuffs by grinding them with textile auxiliaries such, for example, as dispersants, and possibly with other grinding auxiliaries. By subsequent drying, dyestuff preparations are obtained consisting of textile auxiliary and the dyestuff.

Examples of dispersants of the non-ionic groups that can be used with advantage are: addition products of 8 mols of ethylene oxide with 1 mol of p-tert.-octylphenyl, of 15 or 6 mols of ethylene oxide with castor oil, of 20 mols of ethylene oxide with the alcohol $C_{16}H_{33}OH$, ethylene oxide addition products with di-[α-phenylethyl]phenols, polyethylene oxide-tert.-dodecylthioether, polyamine-polyglycol ether or addition products of 15 or 30 mols of ethylene oxide with 1 mol of the amino $C_{12}H_{25}NH_2$ or $C_{18}H_{37}NH_2$.

As anionic dispersants there may be mentioned: sulphuric acid esters of alcohols of the fatty series having 8 to 20 carbon atoms, of the ethyleneoxy adducts of the corresponding fatty acid amides, or of alkylated phenols having 8 to 12 carbon atoms in the alkyl radical; sulphonic acid esters with alkyl radicals having 8 to 20 carbon atoms; sulphation products of unsaturated fats and oils; phosphoric acid esters having 8 to 20 carbon atoms; fatty acid soaps also alkylaryl sulphonates, condensation products of formaldehyde with naphthalenesulphonic acid and lignin sulphonate.

Suitable cationic dispersants are quaternary ammonium compounds that contain alkyl or aralkyl radicals having 8 to 20 carbon atoms.

In addition to the dispersants, the dyestuff preparations can obtain organic solvents, especially solvents that boil above 100° C and preferably are miscible with water, such as mono- and dialkylglycol ether, dioxane, dimethylformamide or dimethylacetamide, tetramethylenesulphone or dimethylsulphoxide. Dyestuff, dispersant and solvent can with advantage be ground with one another.

The polyester fibres are dyed from aqueous dispersion with the dyestuffs according to the invention, which are sparingly soluble in water, according to the conventional processes for polyester materials. Polyesters of aromatic polycarboxylic acids with polyhydric alcohols are dyed preferably at temperatures of over 100° C under pressure. However, the dyeing can also be carried out at the boiling point of the dyed bath in the presence of dyestuff carriers, for example phenylphenols, polychlorobenzene compounds or similar auxiliaries, or according to the thermosol process, that is to say padding with subsequent after-treatment with the application of heat, for example thermosetting, at 180°–210° C. Cellulose 2½-acetate fibres are dyed preferably at temperatures of 80°–85° C, whereas cellulose triacetate fibres are dyed advantageously at the boiling point of the dye bath. The use of dyestuff carriers is superfluous in dyeing cellulose 2½-acetate or polyamide fibres. Anthraquinone dyestuffs according to the invention can also be used for printing the cited materials according to conventional methods.

The anthraquinone dyes of the formula I which are useful as disperse dyes have very good affinity for the synthetic fibre material mentioned hereinbefore, in particular for polyethylene glycol terephthalate fibres, and give thereon full, blue dyeings which have very good fastness to light, washing, rubbing, perspiration, sublimation, solvents and decatising. Mixtures of anthraquinone dyes according to the invention also behave very satisfactorily in this respect.

Furthermore, anthraquinone dyes according to the invention can also be successfully used in admixture with other disperse dyes which are fast to sublimation for dyeing material by the pad dyeing-heat setting process. It is also particularly noteworthy that dyes of the formula I produce level dyeings in the colouration of closely woven polyester fabrics or tightly plied polyester yarns. In addition, the new dyes of the formula I also have the valuable property of making it possible to produce on texturised polyester fibres, e.g. "Crimplene", very full, non-stripy dyeing which have good fastness properties, in particular fastness to light and sublimation. The new anthraquinone dyes also have good stability to liquor and long boiling.

The following Examples will serve to illustrate the invention.

EXAMPLE 1

35.1 of 1,4-diaminoanthraquinone-2,3-dicarboxylic acid-β-hydroxy-ethylimide (=1,3-dioxo-2-β-hydroxyethyl-4,7-diamino-5,6-phthalolyl-dihydroisoindole) are stirred homogeneously for 15 minutes at 40° C in admixture with 350 g of chlorobenzene and 80 g of triethylamine. The mixture is cooled to 25° C and to its are added 30.6 g of acetic anhydride within 45 minutes while stirring vigorously. The batch is subsequently stirred for 5 hours at 50° C to bring the reaction to completion, and finally the reaction product of the formula

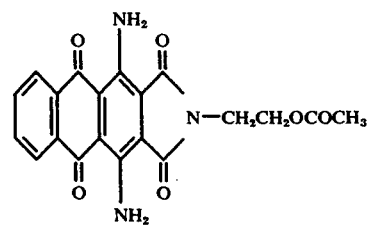

is precipitated in crystalline form by addition of 200 g of methanol, filtered off, washed with methanol and dried. Polyethylene terephthalate fabric is dyed from the aqueous dispersion of the finely divided dye in very pure, greenish blue shades. The dyeings are very fast to light, wet treatments, rubbing and sublimation.

EXAMPLE 2

39.5 g of 1-imino-2-β-hydroxyethoxyethyl-3-oxo-4,7-diamino-5,6-phthaloyldihydroisoindole are partially dissolved by heating to 90° C with 500 g of pyridine and the mixture is then cooled to 40° C. At this temperature, 24.1 g of n-valeric chloride are added dropwise within 20 minutes. After a further 20 minutes the resulting dye of the formula

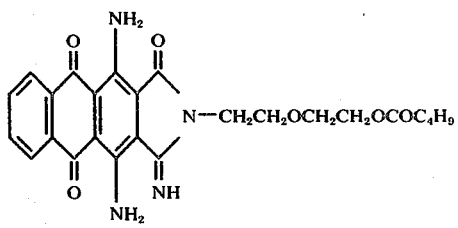

is precipitated in the form of fine, dark blue crystals by treating the reaction mixture with 500 ml of ethyl alcohol. These crystals are filtered off, washed with ethyl alcohol and dried. From their finely divided aqueous dispersion they dye polyethylene terephthalate in pure, greenish blue shades of excellent fastness to light, washing and sublimation.

EXAMPLE 3

35 g of 1,4-diaminoanthraquinone-2,3-dicarboxylic acid-β-aminoethylimide (= 1,3-dioxo-2-β-aminoethyl-4,7-diamino-5,6-phthaloyl-dihydroindoline) are stirred into 350 g of 3-picoline, which have been heated to 90° C. The mixture is cooled to 20° C and then treated with 18.5 g of propionic chloride. After half an hour at this same temperature the reaction is completely terminated and the dye of the formula

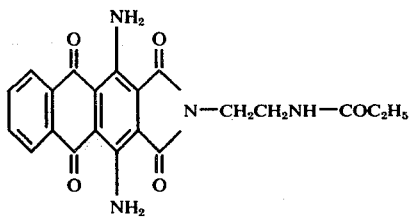

is precipitated almost completely from the reaction mixture by addition of 350 g of methanol, filtered off, washed with methanol and dried.

Polyethylene terephthalate fabrics are dyed from the finely divided aqueous dispersion of this dye in very pure, greenish blue shades of very good fastness to light, washing, rubbing and sublimation.

EXAMPLE 4

39.5 g of 1-imino-2-β-hydroxyethoxyethyl-3-oxo-4,7-diamino-5,6-phthaloyldihydroisoindole are stirred for ½ hour at 60° C in 150 g of N,N-dimethyl formamide. Within 40 minutes 39.6 g of n-butylisocyanate are then added dropwise at 40° C and the reaction is brought to completion with vigorous stirring of the mixture at this temperature within 24 hours. The dark blue dye of the formula

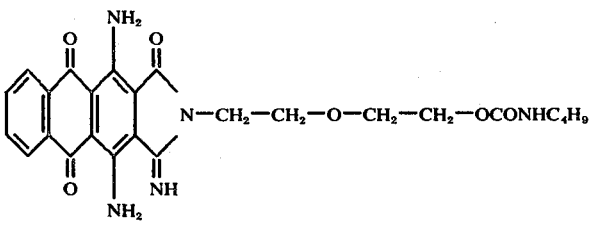

is precipitated in crystalline form by treating the reaction mixture with 150 g of methanol, filtered off, washed with hot methanol and dried. Fabrics of polyethylene terephthalate fibres are dyed from the finely divided aqueous dispersion of this dye in pure, greenish blue shades of excellent fastness to light, wet treatments and sublimation. Valuable blue dyed are obtained analogous to the preceding Examples by reacting the hydroxy compounds listed in column I of the following Table with the acylating agents listed in column II. The resulting dyes all give brilliant, pure shades in the dyeing of polyester fibres:

| I | II |
|---|---|
| 1 ![structure with N—CH₂CH₂—O—CH₂CH₂—OH] | Cl—CO—CH₃ |
| 2 " | Cl—CO—C₂H₅ |
| 3 " | Cl—CO—C₃H₉ (-n) |
| 4 " | Cl—CO—C₄H₉ (-n) |
| 5 " | Cl—CO—C(CH₃)₃ |
| 6 " | Cl—CO—(CH₂)₁₀—CH₃ |
| 7 " | Cl—CO—C₆H₅ |

| | I | II |
|---|---|---|
| 8 | " | O=N=N—CH₃ |
| 9 | " | O=C=N—C₆H₅ |
| 10 | 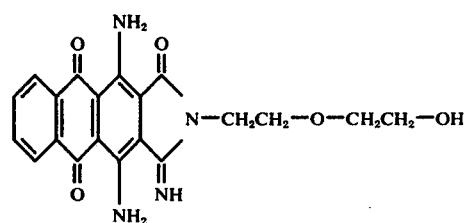 | Cl—CO—CH₃ |
| 11 | " | Cl—CO—C₂H₅ |
| 12 | " | Cl—CO—C₃H₇ (-n) |
| 13 | " | Cl—CO—C₆H₅ |
| 14 | " | Cl—CO—C(CH₃)₃ |
| 15 | 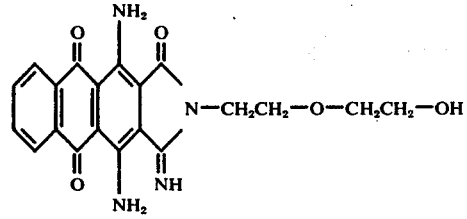 | O=C=N—C₆H₅ |
| 16 | " | O=C=N—CH—CH₂<br>　　　　│　　│<br>　　　CH₂　CH₂<br>　　　　　\\／<br>　　　　　S<br>　　　　　O₂ |
| 17 | " | O=C=N—C₄H₉ (-n) |
| 18 | " | O=C=N—CH₃ |
| 19 | " | O=C=N—C₂H₅ |
| 20 | " | Cl—CO—(CH₂)₁₀CH₃ |
| 21 | " | Cl—CO—C₆H₅ |
| 22 | " | O(CO—C₆H₅)₂ |
| | 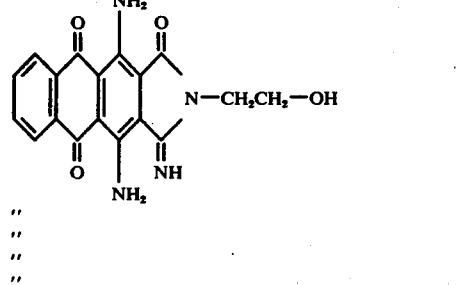 | |
| 23 | " | O(COCH₃)₂ |
| 24 | " | Cl—CO—C₂H₅ |
| 25 | " | Cl—CO—C₆H₅—OCH₃(-p) |
| 26 | " | 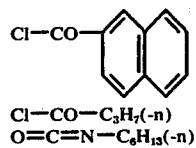 |
| 27 | " | Cl—CO—C₃H₇(-n) |
| 28 | " | O=C=N—C₆H₁₃(-n) |
| 29 | " | Cl—CO—C=CH₂<br>　　　　　│<br>　　　　　CH₃ |
| 30 | " | O=C=N—CH—CH₂<br>　　　　│　　│<br>　　　CH₂　CH₂<br>　　　　　\\／<br>　　　　　SO₂ |
| 31 | " | O=C=N—CH₃ |
| 32 | " | Cl—CO—C₄H₉(-n) |
| 33 | " | Cl—CO—⬡H |
| 34 | " | Cl—CO—CH₂—Cl |
| 35 | " | Cl—CO—CH=CH—⬡ |
| 36 | " | Cl—CO—CH₂—⬡ |
| 37 | " | Cl—CO—(CH₂)₁₀—CH₃ |
| 38 | " | O=C=N—C₄H₉ |
| 39 | " | O=C=N—C₆H₅ |

-continued

| | I | II |
|---|---|---|
| 40 | 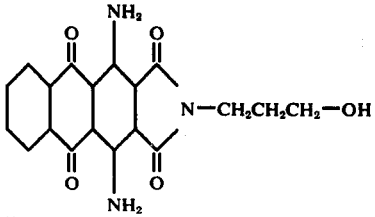 | O(CO—CH₃)₂ |
| 41 | " | Cl—CO—C₂H₅ |
| 42 | " | O=C=N—C₄H₉ (-n) |
| 43 | " | O=C=N—C₆H₅ |
| 44 | " | Cl—CO—C₆H₅ |
| 45 | " | Cl—CO—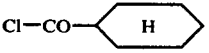 |
| 46 | " | Cl—CO—CH₃ |
| 47 | " | Cl—CO—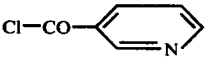 |
| 48 | 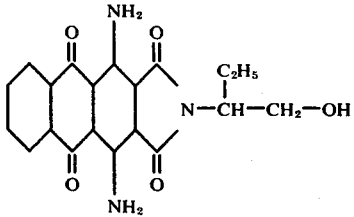 | Cl—COCHCl |
| 49 | " | Cl—CO—C₂H₅ |
| 50 | " | Cl—CO—C₆H₅ |
| 51 | " | Cl—CO—CH₃ |
| 52 | " | O=C=N—C₄H₉(-n) |
| 53 | " | O=C=N—C₆H₁₃ |
| 54 | " | O=C=N—C₆H₅ |
| 55 | " | O=C=N—C₆H₄—Cl (-p) |
| 56 | 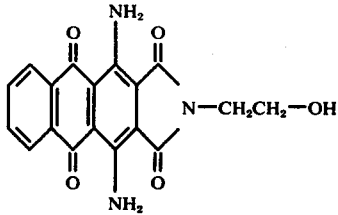 | Br—CO—C₂H₅ |
| 57 | " | Cl—CO—C₃H₇ (-n) |
| 58 | " | Cl—CO—C₄H₉(-n) |
| 59 | " | Cl—CO—C(CH₃)₃ |
| 60 | " | Cl—CO—C₆H₅ |
| 61 | " | O=C=N—C₄H₉(-n) |
| 62 | " | Cl—CO—C₆H₄—Cl (-o) |
| 63 | " | Cl—CO—C₆H₄—NO₂(-p) |
| 64 | " | Cl—CO—C₆H₄—CH₃(-p) |
| 65 | " | Cl—SO₂—C₆H₄—CH₃(-p) |
| 66 | " | Cl—CO—CH₂—Cl |
| 67 | " | Cl—CO—CH=CH₂ |
| 68 | " | O=C=N—CH₃ |
| 69 | " | O=C=N—C₆H₄—NO₂ (-p) |
| 70 | " | O=C=N—C₆H₁₃(-n) |
| 71 | " | O=C=N—C₂H₅ |
| 72 | " | O=C=N—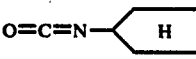 |
| 73 | " | O=C=N—CH₂—C₆H₅ |
| 74 | " | Cl—CO—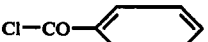 |
| 75 | 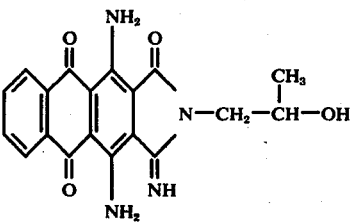 | Cl—CO—C₂H₅ |
| 76 | " | Cl—CO—C₃H₇ (-n) |
| 77 | " | Cl—CO—(CH₂)₁₀—CH₃ |
| 78 | " | Cl—CO—C₆H₅ |
| 79 | " | O=C=N—C₄H₉(-n) |
| 80 | " | O=C=N—C₆H₅ |

-continued

| I | II |
|---|---|
| 81 " | Cl—CO—⟨H⟩ |
| 82 " | Cl—SO$_2$—C$_6$H$_5$ |
| 83 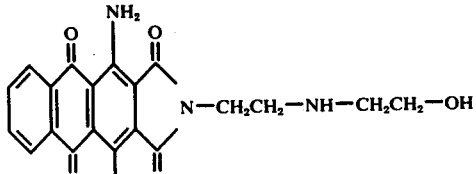 | Cl—CO—CH$_3$ |
| 84 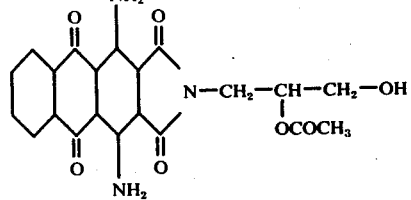 | Cl—CO—CH$_3$ |

EXAMPLE 5

39.4 g of 1-imino-2-β-hydroxyethoxyethyl-3-oxo-4,7-diamino-5,6-phthaloyl-dihydroisoindole are stirred at 100° C in 500 g of 3-picoline for ½ hour. The partial solution is cooled to 40° C and, while stirring, treated dropwise at this temperature within 1¼ hours with 28.4 g of ethyl isocyanate. The reaction is brought to completion by keeping this temperature for a further 24 hours until in a thin layer chromatogram the bands of the starting material have completely disappeared. The reaction product is precipitated almost quantitatively by addition of 500 g of methanol, filtered off at room temperature and washed with methanol. The dark blue product obtained in this way is added — without further drying — to 400 g of concentrated hydrochloric acid at temperature and subsequently stirred for ½ hour at 50°–60° C. The dye mixture of the formulae

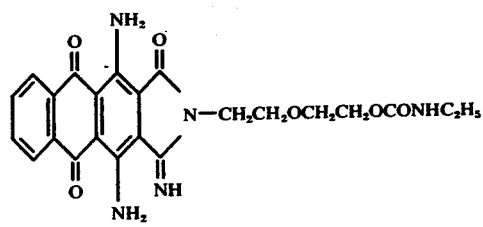

and

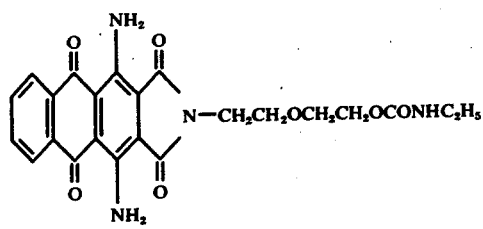

is filtered off at room temperature in practically quantitative yield, washed neutral with water and dried. From its finely divided aqueous dispersion this dye colours polyethylene terephthalate fibres in very pure, greenish blue shades of very good fastness to rubbing, washing, light and sublimation.

The practically identical dye possessing the same good properties is obtained if, instead of starting from 39.4 g of 1-imino-2-β-hydroxyethoxyethyl-3-oxo-4,7-diamino-5,6-dihydroisoindole, a start is made from a mixture thereof with 19.7 g of 1,4-diaminoanthraquinone-2,3-dicarboxylic acid-β-hydroxyethoxyethyl-imide, said mixture is acylated in the manner described hereinbefore, the resulting dyestuff mixture is isolated and immediately converted into a fine aqueous dispersion.

EXAMPLE 6

2 g of the dye obtained according to Example 5 are dispersed in 4000 g of water. To this dispersion are added 12 g of the sodium salt of o-phenyl-phenol as swelling agent and 12 g of diammonium phosphate and 100 g of polyethylene glycol terephthalate yarn are dyed for 1 1/5 hours at 95°–98° C. The dyeing is rinsed and subjected to an aftertreatment with aqueous sodium hydroxide solution and a dispersing agent. A full, dyeing which is fast to light and sublimation is obtained in this manner. A full, blue dyeing which is very fast to washing and sublimation is obtained by substituting in the above Example 100 g of cellulose triacetate fabric for the 100 g of polyethylene glycol terephthalate yarn, dyeing under the stated conditions and subsequently rinsing the dyeing with water.

EXAMPLE 7

A fine suspension of 2 g of the dye obtained according to Example 1 in 2000 g of water, which contains 4 g of oleyl polyglycol ether, is prepared in a pressure dyeing apparatus. The pH of the dyebath is adjusted to 4–5 with acetic acid. A polyethylene glycol terephthalate fabric (100 g) is put into this bath at 50° C, the bath is heated to 140° C within 30 minutes and dyeing is carried out for 50 minutes at this temperature. The dyeing is subsequently rinsed with water, soaped, and dried. By maintained these conditions a full, level, blue dyeing which is fast to perspiration, light and sublimation is obtained. The dyes described in the other Examples produce dyeings of equal quality by this process.

EXAMPLE 8

Polyethylene glycol terephthalate fabric is impregnated on a foulard at 40° C with a liquor of the following composition:

| | |
|---|---|
| 20 | g of the dye obtained according to Example 11, finely dispersed in |
| 7.5 | g of sodium alginate |
| 20 | g of triethanolamine |
| 20 | g of octylphenyl polyglycol ether and |
| 900 | g of water. |

The fabric which is squeezed to about 100% weight increase is dried at 100° C and subsequently fixed at a temperature of 210° C for 30 seconds. The dyed goods are rinsed with water, soaped, and dried. A full, blue dyeing which is fast to rubbing, light and sublimation is obtained under these conditions. The dyes described in the other Examples yield dyeings of equal quality by this process.

EXAMPLE 9

7 g of the dye obtained according to Example 5 are ground in a ball mill with 13 g of sulphite cellulose lye powder and 100 ml of water. The resulting paste is dried by atomising and a dry dye preparation is obtained.

EXAMPLE 10

7 g of the dye obtained according to Example 1 are ground in a ball mill to a fine powder with 4 g of dinaphthalmethanedisulphonic acid, 4 g of sodium acetyl sulphate and 5 g of anhydrous sodium sulphate. The resulting dyestuff preparation can be made into a paste with a small amount of water and then added through a sieve to 4000 l of a dyebath which contains 3 parts of sodium lauryl sulphate.

EXAMPLE 11

1 g of the dye obtained according to Example 1, together with 2 g of sodium lignin sulphonate and 2 g of the sodium salt of dinapthalmethane-disulphonic acid, are ground in the presence of water and quartz sand as grinding agent, until the average particle size is in the range of 1 micron. The resulting finely dispersed suspension is separated from the grinding agent through a sieve and evaporated to dryness. 3 g of this dyestuff preparation are dispersed in 4000 g of water. To this dispersion are added 2 g of sodium dinaphthylmethane-disulphonate, 20 g of diammonium phosphate and 20 g of the sodium salt of o-phenyl-phenol as carrier and a bath for the carrier dyeing is obtained in this way.

EXAMPLE 12

A fluid mixture of 62 g of nonylphenyl/ethylene oxide adduct (molar ratio 1:12) and 8 g of ethylene glycol monomethyl ether is charged into a turbine mixer (Homo-Rex type), and 20 g of the dye obtained according to Example 5 are slowly added in small amounts. A virtually anhydrous, viscous dyestuff preparation is obtained. It is possible to prepare a padding by stirring in 3 g of the dyestuff preparation in 100 ml of an aqueous solution which contains 25 g of 2.5% sodium alginate solution and 2 g of triethanolamine.

I claim:
1. An anthraquinone dye of sparing aqueous solubility, of the formula

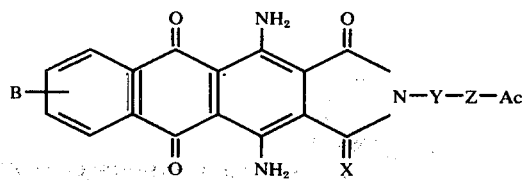

wherein
X represents oxygen or NH,
Y represents alkylene having up to 10 carbon atoms or alkylene of up to 10 carbon atoms interrupted by a thio group, an imino group, an N-methyl imino group, or one or two oxy groups, or is alkylene of up to 10 carbon atoms substituted by an —OH group or an —OAc group,
Z represents oxy or —NR$_1$, in which
R$_1$ represents alkyl of 1–4 carbon atoms or hydrogen,
Ac represents formyl or unsubstituted or substituted alkyl and alkenyl carbonyl having up to 18 carbon atoms wherein the substituents are selected from the group consisting of bromo, methylmercapto, chloro and ethoxy; or cycloalkylcarbonyl having up to 18 carbon atoms; or an araliphatic carbonyl selected from the group consisting of phenylacetyl, β-phenylpropionyl, methylphenylacetyl, phenoxyacetyl, p-chlorophenoxyacetyl and cinnamylcarbonyl; or aromatic carbonyl selected from the group consisting of benzoyl, methylbenzoyl, chlorobenzoyl, nitrobenzoyl, methylmethoxybenzoyl, benzoylbenzoyl, chloronitrobenzoyl, dimethylbenzoyl, ethoxybenzoyl, α-napthoyl and β-napthoyl; or a substituted or unsubstituted alkyl sulfonyl having up to 18 carbon atoms wherein the substituents are selected from the group consisting of methoxy and ethoxy; or aromatic sulfonyl selected from the group consisting of benzenesulfonyl, toluenesulfonyl, ethylbenzenesulfonyl, dimethylbenzenesulfonyl and ethoxybenzenesulfonyl; or a cycloalkyl sulfonyl having up to 18 carbon atoms; or a substituted or unsubstituted alkyl carbamyl having up to 18 carbon atoms wherein the substituents are selected from the group consisting of chloro, methoxycarbonyl and butoxycarbonyl; or a cycloalkyl carbamyl having up to 18 carbon atoms; or an aromatic carbamyl selected from the group consisting of p-phenylazophenylcarbamyl, phenylcarbamyl, tolylcarbamyl, chlorophenylcarbamyl, dimethylphenylcarbamyl, nitrophenylcarbamyl, dichlorophenylcarbamyl, methoxyphenylcarbanyl, napthlcarbamyl and biphenylylcarbamyl; or a heterocyclic carbamyl selected from the group consisting of tetrahydrofuryl-2-carbamyl, pyridyl-3-carbamyl, furyl-2-carbamyl and sulfonamyl-3-carbamyl; and
B represents chlorine, bromine or hydrogen.
2. An anthraquinone dye according to claim 1, wherein R$_1$ and B are hydrogen.
3. An anthraquinone dye of sparing aqueous solubility of the formula

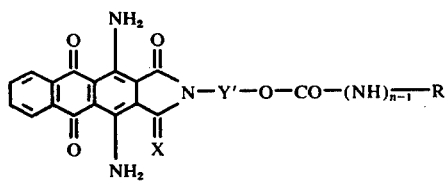

wherein
X represents oxygen or NH,
n is 1 or 2,
R represents unsubstituted or substituted alkyl or cycloalkyl having up to 17 carbon atoms; or an aromatic selected from the group consisting of benzyl, phenyl, β-phenethyl, methylphenyl, phenoxy, p-chlorophenoxy, styryl, chlorophenyl, nitrophenyl, methylmethoxyphenyl, diphenyl, chloronitrophenyl, dimethylphenyl, acetoxyphenyl, α-napthyl and β-napthyl; or an heterocyclic selected from the group consisting of tetrahydrofuryl-2-, pyridyl-3-, furyl-2- or sulfonamyl; and
Y' represents alkylene having up to 4 carbon atoms which is interrupted by one or two oxy groups or substituted by a hydroxy or a —O—CO—R group.

4. A dye according to claim 3, wherein n is 1 and X is 0.
5. A dye according to claim 3, wherein n is 2 and X is 0.
6. A dye according to claim 3, wherein n is 1 and X is NH.
7. A dye according to claim 3, wherein n is 2 and X is NH.
8. A dyestuff as claimed in claim 3 of the formula

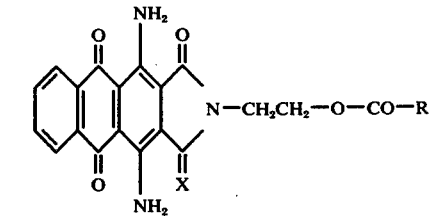

9. A dyestuff as claimed in claim 3 of the formula

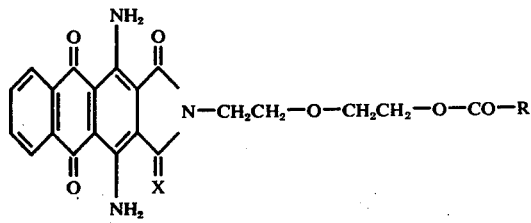

10. A dyestuff as claimed in claim 1 of the formula

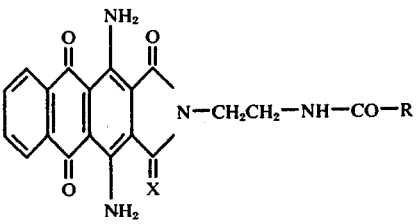

11. A dyestuff as claimed in claim 3 of the formula

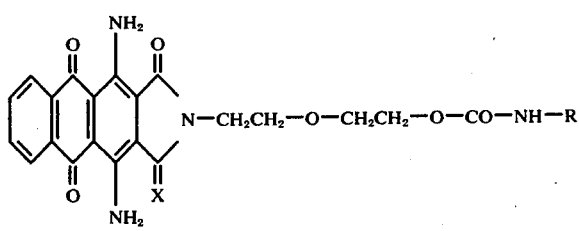

12. A dyestuff as claimed in claim 3 of the formula

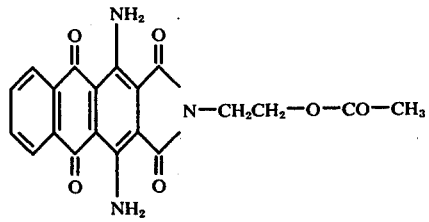

13. A dyestuff as claimed in claim 3 of the formula

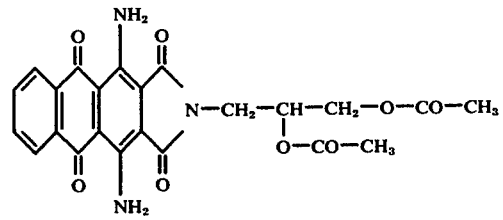

14. A dyestuff as claimed in claim 5 of the formula

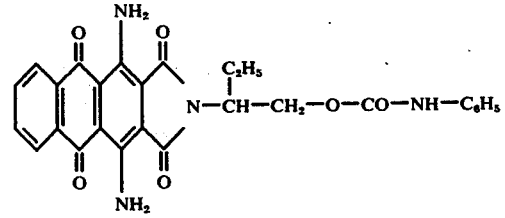

* * * * *